United States Patent
Rahman et al.

(10) Patent No.: US 11,118,018 B2
(45) Date of Patent: Sep. 14, 2021

(54) STABLE WATERBORNE POLYURETHANE/CLAY NANOCOMPOSITE

(71) Applicant: King Fahd University of Petroleum and Minerals, Dhahran (SA)

(72) Inventors: Mohammad Mizanur Rahman, Dhahran (SA); Ahmad Sorour, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 62 days.

(21) Appl. No.: 15/994,239

(22) Filed: May 31, 2018

(65) Prior Publication Data
US 2019/0367686 A1   Dec. 5, 2019

(51) Int. Cl.
| | |
|---|---|
| *C08G 18/12* | (2006.01) |
| *C08G 18/28* | (2006.01) |
| *C08G 18/70* | (2006.01) |
| *C08K 3/34* | (2006.01) |
| *C08L 75/04* | (2006.01) |
| *C08J 3/05* | (2006.01) |
| *C08K 5/19* | (2006.01) |
| *C08G 18/08* | (2006.01) |
| *C08G 65/34* | (2006.01) |

(52) U.S. Cl.
CPC .......... *C08J 3/05* (2013.01); *C08G 18/0838* (2013.01); *C08G 18/12* (2013.01); *C08G 18/28* (2013.01); *C08G 18/70* (2013.01); *C08K 3/346* (2013.01); *C08K 5/19* (2013.01); *C08L 75/04* (2013.01); *C08G 65/34* (2013.01); *C08L 2201/54* (2013.01); *C08L 2666/62* (2013.01)

(58) Field of Classification Search
None
See application file for complete search history.

(56) References Cited

U.S. PATENT DOCUMENTS

| 2011/0081494 A1* | 4/2011 | Khabashesku ......... B82Y 30/00 427/385.5 |
|---|---|---|
| 2014/0343224 A1 | 11/2014 | Su et al. |

FOREIGN PATENT DOCUMENTS

| CN | 101565588 B | 4/2011 |
|---|---|---|
| CN | 104098996 A | 10/2014 |

OTHER PUBLICATIONS

Açikalin, E. et al., "Preparation of Waterborne Polyurethane-OMt Nanocomposites and Effect of Clay on UV Degradation". Macromolecular Symposia (2014), 338(1), 17-27. (Year: 2014).*

Rafiemanzelat, F. et al., "Effective preparation of clay/waterborne Azo-containing polyurethane nanocomposite dispersions incorporated anionic groups in the chain termini". Designed Monomers and Polymers 2015, 18(4), 303-314. (Year: 2015).*

(Continued)

*Primary Examiner* — Richard A Huhn
(74) *Attorney, Agent, or Firm* — Oblon, McClelland, Maier & Neustadt, L.L.P.

(57) ABSTRACT

A method of preparing stable waterborne polyurethane nanocomposite with a long shelf-life time is described. The stability of the nanocomposite is achieved by effective mechanical and sonication mixing of diisocynate and clay. Also, the stability is achieved through optimization of the amount of clay and carboxylic acid with hydroxyl functionality.

8 Claims, 7 Drawing Sheets

(56) References Cited

OTHER PUBLICATIONS

Serkis, Magdalena ; Nanocomposites made from thermoplastic waterborne polyurethane and colloidal silica. The influence of nanosilica type and amount on the functional properties ; Sep. 13, 2016 ; Abstract ; http://www.sciencedirect.com/science/article/pii/S03094401630282X.
Wu, Yan ; Preparation of waterborne polyurethane nanocomposite reinforced with halloysite nanotubes for coating applications ; Jun. 25, 2016 ; Abstract ; http://onlinelibrary.wiley.com/doi.10.1002/app.43949/abstract.
Chiu, Hsien-Tang ; Synthesis, morphology, and properties of waterborne m-TMXDI-based anionic polyurethane and hybrids ; Apr. 30, 2014 ; Abstract ; https://link.springer.com/article/10.1134/S1560090414020043.
Wu, Geng-His ; Synthesis of water-based cationic polyurethane for antibacterial and gene delivery applications ; Oct. 1, 2016 ; Abstract ; http://www.sciencedirect.com/science/article/pii/S0927776516305033.
Rahman, Mohammad Mizanur ; Preparation and characterization of waterborne polyurethane/clay nanocomposite: Effect on water vapor permeability ; Sep. 17, 2008 ; Abstract ; http://onlinelibrary.wiley.com/doi/10.1002/app.28985/abstract.

\* cited by examiner

Figure 3
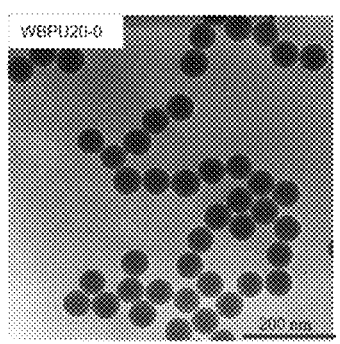
Figure 3a
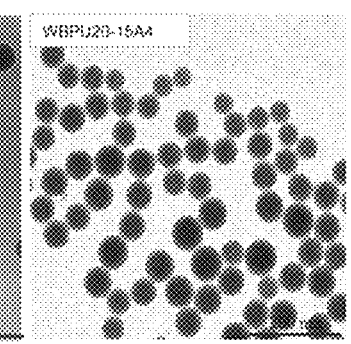
Figure 3c
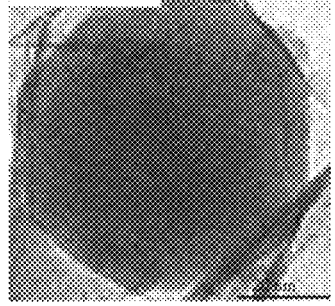
Figure 3b
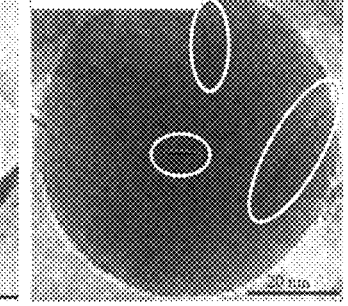
Figure 3d

STABLE WATERBORNE POLYURETHANE/CLAY NANOCOMPOSITE

STATEMENT OF FUNDING ACKNOWLEDGEMENT

This project was funded by Center of Research Excellence in Corrosion, King Fand University of Petroleum and Minerals (KFUPM), Deanship of Scientific Research.

BACKGROUND OF THE INVENTION

Field of the Disclosure

The present invention relates to a stable waterborne polyurethane/clay nanocomposite and method of making the nanocomposite.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Despite the many intriguing and excellent thermal and mechanical properties of clay nanocomposites, the application of these nanocomposites is still limited. One of the main challenges in clay nanocomposite research is obtaining homogeneous dispersion of clays in different solvent media and polymer matrices. The clays are often unstable in various solvents and can agglomerate in nanocomposite films. To achieve the best performance of nanocomposite materials, it is necessary to avoid agglomeration in both the solvent and composite stages [Messersmith et al. "Synthesis and Characterization of Layered Silicate-Epoxy Nanocomposites." Chem. Mater. 6 1719-1725 (1994); Lan et al. "Clay-Reinforced Epoxy Nanocomposites." Chem. Mater: 6 2216-2219 (1994); Kotal et al. "Polymer Nanocomposites from Modified Clays: Recent Advances and Challenges." Prog. Polym. Sci. 51 127-187 (2015); Lvov et al. "Functional Polymer—Clay Nanotube Composites with Sustained Release of Chemical Agents." Prog. Polym. Sci. 38 1690-1719 (2013); Abdullayev et al. "Clay Nanotubes for Corrosion Inhibitor Encapsulation: Release Control with End Stoppers." J. Mater. Chem., 20 6681-6687 (2010); Najafi, et al. "Toward UV-Curable Urethane Acrylate/Silica Hybrid Coatings: Introducing Urethane Methacrylate Trimethoxysilane (UAMS) as Organic-Inorganic Coupling Agent." Prog. Organ. Coat. 77 1957-1965 (2014); and Hwang et al. "Influence of Organophilic Clay on the Morphology, Plasticizer-Maintaining Ability, Dimensional Stability, and Electrochemical Properties of Gel Polyacrylonitrile (PAN) Nanocomposite Electrolytes." Macromolecules, 35 7314-7319 (2002)].

Over the last decade, polymer nanocomposites have been formed with different polymers, such as acrylate, epoxy, and polyurethane [Chattopadhyay et al. "Structural Engineering of Polyurethane Coatings for High Performance Applications." Prog. Polym. Sci. 32 352-418 (2007); Lee et al. "Effects of Ionic Interactions Between Clay and Waterborne Polyurethanes on the Structure and Physical Properties of their Nanocomposite Dispersions." J. Polym. Sci. A Polym. Chem. 44 5801-5807 (2006); and Lee et al. "Waterborne Polyurethane/Clay Nanocomposites: Novel Effects of the Clay and Its Interlayer Ions on the Morphology and Physical and Electrical Properties." Macromolecules, 39 6133-6141 (2006)]. In the past several years, waterborne polyurethane (WBPU)/clay nanocomposites have attracted much attention, particularly in the adhesive and coating industries, because of their unique properties compared to conventional WBPU. Among these properties are high tensile strength and initial modulus, high thermal stability, and improved barrier properties and chemical stability. The properties of the nanocomposite are depend on monomers and composition, as well as increasing the homogeneity of the dispersed clay content [Rahman et al. (2017); Kim et al. (2003); Rahman et al. (2006); Chinwanticharoen et al. "Preparation and Shelf Life Stability of Aqueous Polyurethane Dispersions." Macromol. Syrup. 216 229-239 (2004); Deng et al. "Preparation, Structure and Properties of Comb-Branched Waterborne Polyurethane/OMMT Nanocomposites." Prog. Organ. Coat. 60 11-16 (2007); and Huh et al. "Properties of Waterborne Polyurethane/Clay Nanocomposite Adhesive." J. Adhes. Sci. Technol. 23 739-751 (2009)]. Despite the promising performance of WBPU/clay nanocomposites, clay agglomeration in dispersions and nanocomposites represented a major challenge [Rahman, M M, "Improvements of Antimicrobial and Barrier Properties of Waterborne Polyurethane Containing Hydroxyapatite-Silver Nanoparticles." J. Adhes. Sci. Technol. 31 613-626 (2017); Kim et al. "Morphology and Properties of Waterborne Polyurethane/Clay Nanocomposites." Eur. Polym. 1 39 85-91 (2003); and Rahman et al. "Synthesis and Characterization of Waterborne Polyurethane/Clay Nanocomposite-Effect on Adhesive Strength." Macromol. Symp. 249-250 251-258 (2006)].

Although it is well-accepted that the clay content should achieve the best performance, minimizing or avoiding clay agglomeration in WBPU dispersion has not been examined. No study is found on the stability of WBPU/clay nanocomposite dispersions or the criteria that may affect it. The use Cloisite 30B® instead of Cloisite 15A® is reported to improve the properties WBPU/clay nanocomposite dispersions (Huh et al. 2009). The instant disclosure describes the production of a stable dispersion resistant to agglomeration by altering ionic interaction, introducing polar groups to the clay surface, and applying mechanical mixing forces that includes sonication. TEM images are taken to evaluate the effect of these conditions on clay agglomeration. Also, the zeta potential, particle size, particle size distribution, and viscosity of WBPU/clay nanocomposite dispersions are evaluated.

Accordingly, it is the object of the present disclosure is to provide a method for preparing waterborne polyurethane/clay nanocomposite dispersion.

SUMMARY

A first aspect of the invention is directed to a method for preparing waterborne nanocomposite dispersion, comprising:

mixing a diisocyanate to an organoclay to form a first mixture;

mixing a polyol to a carboxylic acid having hydroxyl functionality in a solvent to form a second mixture;

mixing the first mixture to the second mixture and heating at a temperature in a range of 40-90° C. for 2-6 hours to form a prepolymer with a carboxylic acid group;

adding a base to the prepolymer with a carboxylic acid group to form a prepolymer with a carboxylic acid salt;

mixing water with the prepolymer with a carboxylic acid salt to form a dispersion; and reacting the dispersion with a diamine as a chain extender to form the waterborne nanocomposite dispersion.

A preferred embodiment of the method further comprises sonicating the first mixture for 10-30 minutes prior to adding it to the second mixture.

Another preferred embodiment of the method utilizes an organoclay which is a Cloisite®, more preferably Cloisite 15A® or Cloisite 30B®.

In another preferred embodiment, the diisocyanate used in the method may be selected from the group comprising isophorone diisocyanate, methylene bis-phenyl isocyanate, hexamethylene diisocyanate, and 4,4'-dicyclohexylmethane diisocyanate. In a more preferred embodiment of the method, the diisocyanate is 4,4'-dicyclohexylmethane diisocyanate.

In another preferred embodiment, the polyol used in the method may be selected from the group comprising poly(tetramethyleneoxide) glycol, polyethylene glycol, polybutylene glycol, and polypropylene glycol. In a preferred embodiment of the method, the polyol used in the method is poly(tetramethyleneoxide) glycol.

In another preferred embodiment, any carboxylic acid containing at least two hydroxyl groups may be used in the method. In a more preferred embodiment of the method, the carboxylic acid is selected from the group comprising dimethylolpropionic (DMPA), also known as 2,2-bis(hydroxymethyl)propionic acid, 2,2-bis(hydroxymetyl)butyric acid, and 3-hydroxy-2,2bis(hydroxymethl)propionic acid. In the most preferred embodiment, the carboxylic acid is dimethylol propionic acid.

In another preferred embodiment, the solvent is selected from the group comprising dimethylformamide, dimethyl sulfoxide, and 1-methyl-2-pyrrolidone. In a more preferred embodiment of the method, the solvent is 1-methyl-2-pyrrolidone.

A second aspect of the invention is waterborne polyurethane/clay nanocomposite dispersion produced by the method described herein.

A third aspect of the invention is waterborne nanocomposite dispersion, comprising:
water in an amount of 30-90 wt. % relative to a total weight of the dispersion;
and a polyurethane/clay nanocomposite with a mean particle size of 40-80 nm dispersed in the water, wherein the nanocomposite comprises:
a polyurethane polymer formed by a diisocyanate, a polyol, a carboxylic acid salt having hydroxyl functionality, and a diamine;
wherein a molar ratio of a total number of mols of the polyol, the carboxylic acid salt having a hydroxyl functionality and the diamine to a number of mols of the diisocyanate is in a range of 0.9-1.1; and
wherein a molar content of the carboxylic acid salt is in a range of 10-30 mol % relative to the polyurethane polymer; and
an organoclay in an amount of 0.1-5.0 wt. % relative to a total weight of the nanocomposite.

A preferred embodiment of the waterborne nanocomposite dispersion comprises a clay which is a Cloisite®, preferably Cloisite 15A® or Cloisite 30B®.

Another preferred embodiment of the waterborne nanocomposite dispersion is formed by the reaction of a diisocyanate selected from the group consisting of isophorone diisocyanate, methylene bis-phenyl isocyanate, hexamethylene diisocyanate, and 4,4'-dicyclohexylmethane diisocyanate. In a more preferred embodiment, the diisocyanate is 4,4'-dicyclohexylmethane diisocyanate.

In another preferred embodiment of the waterborne nanocomposite dispersion, the polyol is selected from the group consisting of poly(tetramethyleneoxide) glycol, polyethylene glycol, butylene glycol, and polypropylene glycol. In a more preferred embodiment, the polyol is poly(tetramethyleneoxide) glycol.

In another preferred embodiment, the waterborne nanocomposite dispersion comprises a carboxylic acid containing at least two hydroxyl groups. In a preferred embodiment, the carboxylic acid is selected from the group comprising dimethylolpropionic (DMPA), also known as 2,2-bis(hydroxymethyl)propionic acid, 2,2-bis(hydroxymetyl)butyric acid, and 3-hydroxy-2,2bis(hydroxymethl)propionic acid. In a more preferred embodiment, the carboxylic acid is dimethylol propionic acid.

In a more preferred embodiment, the waterborne nanocomposite dispersion contains about 2.5% by weight of clay and about 23.6 mol % dimethylol propionic acid.

In another more preferred embodiment, the waterborne nanocomposite dispersion has a zeta potential of −0.50 to −0.2 mV.

In another more preferred embodiment, the waterborne nanocomposite dispersion has a viscosity of 80 cP to 460 cP.

In the most preferred embodiment, the waterborne nanocomposite dispersion has a shelf time of up to 9-24 months.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3a shows TEM photograph of WBPU20-0.

FIG. 3b shows TEM photograph of WBPU20-15A5.

FIG. 3c shows TEM photograph of WBPU20-15A4.

FIG. 3d shows TEM photograph of WBPU20-30B4M.

DETAILED DESCRIPTION

Figure 1:
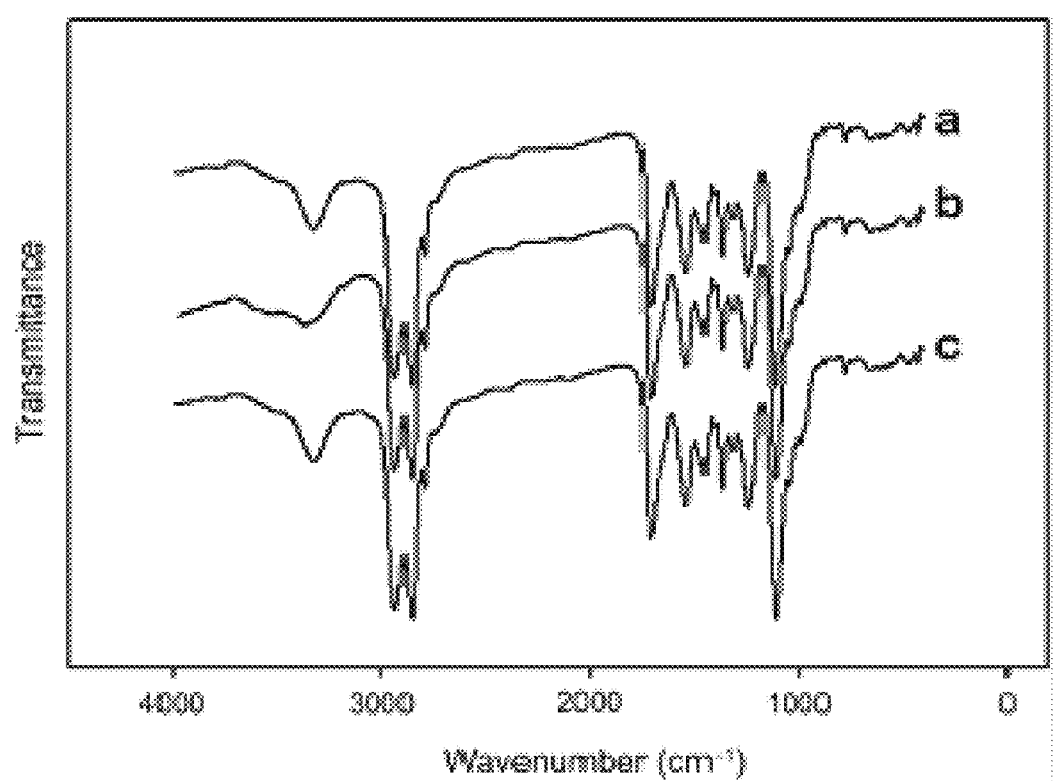
FIG. 1 shows FTIR spectra of dispersions (a) WBPU 20, (b) WBPU 20-30B4-M, and (c) WBPU 20-15A4-M.

Embodiments of the present disclosure will now be described more fully hereinafter with reference to the accompanying drawings, in which some, but not all embodiments of the disclosure are shown. The present disclosure will be better understood with reference to the following definitions.

All publications mentioned herein are incorporated herein by reference in full for the purpose of describing and disclosing the methodologies, which are described in the publications, which might be used in connection with the description herein. The publications discussed above and throughout the text are provided solely for their disclosure prior to the filing date of the present application. Nothing herein is to be construed as an admission that the inventors are not entitled to antedate such disclosure by virtue of prior disclosure. Also, the use of "or" means "and/or" unless stated otherwise. Similarly, "comprise," "comprises," "comprising" "include," "includes," and "including" are interchangeable and not intended to be limiting.

As used herein, the terms "compound" is intended to refer to a chemical entity, whether in a solid, liquid or gaseous phase, and whether in a crude mixture or purified and isolated.

As used herein a "polymer" or "polymeric resin" refers to a large molecule or macromolecule, of many repeating subunits and/or substances composed of macromolecules. As used herein a "monomer" refers to a molecule or compound that may bind chemically to other molecules to form a polymer. As used herein the term "repeat unit" or "repeating unit" refers to a part of the polymer or resin whose repetition would produce the complete polymer chain (excluding the end groups) by linking the repeating units together successively along the chain. The method by which monomers combine end to end to form a polymer is referred to herein as "polymerization" or "polycondensation", monomers are molecules which can undergo polymerization, thereby contributing constitutional repeating units to the structures of a macromolecule or polymer. As used herein "resin" or "polymeric resin" refers to a solid or highly viscous substance or polymeric macromolecule containing polymers, preferably with reactive groups. As used herein a "copolymer" refers to a polymer derived from more than one species of monomer and are obtained by "copolymerization" of more than one species of monomer. Copolymers obtained by copolymerization of two monomer species may be termed bipolymers, those obtained from three monomers may be termed terpolymers and those obtained from four monomers may be termed quarterpolymers, etc. As used herein, "cross-linking", "cross-linked" or a "cross-link" refers to polymers and resins containing branches that connect polymer chains via bonds that link one polymer chain to another.

The cross-link may be an atom, a group of atoms, or a number of branch points connected by bonds, groups of atoms, or polymer chains. In the majority of cases, a cross-link is a covalent structure or covalent bond but the term may also describe sites of weaker chemical interactions, portion crystallites, and even physical interactions and entanglements. The cross-linking can alter the physical and mechanical properties of the polymer. Cross-linking may be formed by chemical reactions that are initiated by heat, pressure, change in pH, and/or radiation, with or without the presence of a cross-linking agent and/or catalyst. In certain embodiments, at least one diaminoalkane a cross-linking agent for the cross-linked polymeric resin described herein.

As used herein, the term "salt" refers to derivatives of the disclosed compounds, monomers or polymers wherein the parent compound is modified by making acid or base salts thereof. Exemplary salts include, but are not limited to, mineral or organic acid salts of basic groups such as amines, and alkali or organic salts of acidic groups such as carboxylic acids. The salts of the present disclosure can be synthesized from the parent compound that contains a basic or acidic moiety by conventional chemical methods. Generally such salts can be prepared by reacting the free acid or base forms of these compounds with a stoichiometric amount of the appropriate base or acid in water or in an organic solvent, or in a mixture of the two; generally non-aqueous media like ether, ethyl acetate, ethanol, isopropanol, or acetonitrile are preferred.

As used herein, the term "about" refers to an approximate number within 20% of a stated value, preferably within 15% of a stated value, more preferably within 10% of a stated value, and most preferably within 5% of a stated value. For example, if a stated value is about 8.0, the value may vary in the range of 8±1.6, ±1.0, ±0.8, ±0.5, ±0.4, ±0.3, ±0.2, or ±0.1.

As used herein, the term "solvate" refers to a physical association of a compound, monomer or polymer of this disclosure with one or more solvent molecules, whether organic or inorganic. This physical association includes hydrogen bonding. In certain instances, the solvate will be capable of isolation, for example when one or more solvent molecules are incorporated in the crystal lattice of a crystalline solid. The solvent molecules in the solvate may be present in a regular arrangement and/or a non-ordered arrangement. The solvate may comprise either a stoichiometric or nonstoichiometric amount of the solvent molecules. Solvate encompasses both solution phase and isolable solvates. Exemplary solvates include, but are not limited to, hydrates, ethanolates, methanolates, isopropanolates and mixtures thereof. Methods of solvation are generally known to those of ordinary skill in the art.

As used herein, the term "stereoisomer" refers to isomeric molecules that have the same molecular formula and sequence of bonded atoms (i.e. constitution), but differ in the three-dimensional orientations of their atoms in space. This contrasts with structural isomers, which share the same molecular formula, but the bond connection of their order differs. By definition, molecules that are stereoisomers of each other represent the same structural isomer. Enantiomers are two stereoisomers that are related to each other by reflection, they are non-superimposable mirror images. Every stereogenic center in one has the opposite configuration in the other. Two compounds that are enantiomers of each other have the same physical properties, except for the direction in which they rotate polarized light and how they interact with different optical isomers of other compounds. Diastereomers are stereoisomers not related through a reflection operation, they are not mirror images of each other. These include meso compounds, cis- and trans- (E- and Z-) isomers, an non-enantiomeric optical isomers. Diastereomers seldom have the same physical properties. In terms of the present disclosure, stereoisomers may refer to enantiomers, diastereomers or both.

The present disclosure is further intended to include all isotopes of atoms occurring in the present compounds. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopically labeled compounds of the invention can generally be prepared by conventional techniques known to those skilled in the art or by processes and methods analogous to those described herein, using an appropriate isotopically labeled reagent in place of the non-labeled reagent otherwise employed.

As used herein, the term "substituted" refers to at least one hydrogen atom that is replaced with a non-hydrogen group, provided that normal valences are maintained and that the substitution results in a stable compound. When a substituent is noted as "optionally substituted", the substituents are selected from the exemplary group including, but not limited to, halo, hydroxyl, alkoxy, oxo, alkanoyl, aryloxy, alkanoyloxy, amino, alkylamino, arylamino, arylalkylamino, disubstituted amines (e.g. in which the two amino substituents are selected from the exemplary group including, but not limited to, alkyl, aryl or arylalkyl), alkanylamino, aroylamino, aralkanoylamino, substituted alkanoylamino, substituted arylamino, substituted aralkanoylamino, thiol, alkylation, arylthio, arylalkylthio, alkylthiono, arylthiono, aryalkylthiono, alkylsulfonyl, arylsulfonyl, arylalkylsulfonyl, sulfonamide (e.g. —$SO_2NH_2$), substituted sulfonamide, nitro, cyano, carboxy, carbamyl (e.g. —$CONH_2$), substituted carbamyl (e.g. —CONHalkyl, —CONHaryl, —CONHarylalkyl or cases where there are two substituents on one nitrogen from alkyl, aryl, or alkylalkyl), alkoxycarbonyl, aryl, substituted aryl, guanidine, heterocyclyl (e.g. indolyl, imidazoyl, furyl, thienyl, thiazolyl, pyrrolidyl, pyridyl, pyrimidiyl, pyrrolidinyl, piperidinyl, morpholinyl, piperazinyl, homopiperazinyl and the like), substituted heterocyclyl and mixtures thereof and the like.

As used herein, the term "alkyl" unless otherwise specified refers to both branched and straight chain saturated aliphatic primary, secondary, and/or tertiary hydrocarbons of typically $C_1$ to $C_{10}$, and specifically includes, but is not limited to, methyl, trifluoromethyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, and 2,3-dimethylbutyl. As used herein, the term optionally includes substituted alkyl groups. Exemplary moieties with which the alkyl group can be substituted may be selected from the group including, but not limited to, hydroxyl, amino, alkylamino, arylamino, alkoxy, aryloxy, nitro, cyano, sulfonic acid, sulfate, phosphonic acid, phosphate, or phosphonate or mixtures thereof. The substituted moiety may be either protected or unprotected as necessary, and as known to those skilled in the art.

As used herein, the term "cycloalkyl" refers to cyclized alkyl groups. Exemplary cycloalkyl groups include, but are not limited to, cyclopropyl, cyclobutyl, cyclopentyl, cyclohexyl, norbornyl, and adamantyl. Branched cycloalkyl groups such as exemplary 1-methylcyclopropyl and 2-methylcyclopropyl groups are included in the definition of cycloalkyl as used in the present disclosure.

As used herein, the term "aryl" unless otherwise specified refers to functional groups or substituents derived from an aromatic ring including, but not limited to, phenyl, biphenyl, naphthyl, thienyl, and indolyl. As used herein, the term optionally includes both substituted and unsubstituted moieties. Exemplary moieties with which the aryl group can be substituted may be selected from the group including, but not limited to, hydroxyl, amino, alkylamino, arylamino, alkoxy, aryloxy, nitro, cyano, sulfonic acid, sulfate, phosphonic acid, phosphate or phosphonate or mixtures thereof. The substituted moiety may be either protected or unprotected as necessary, and as known to those skilled in the art.

As used herein, the term "wt. %" refers to the percentage of the organoclay by weight in the total weight of nanocomposite.

In one aspect the present disclosure is directed to a waterborne polyurethane (WBPU)/clay nanocomposite and method of making the nanocomposite.

A first aspect of the invention is directed to a method for preparing waterborne polyurethane/clay nanocomposite dispersion, comprising:

mixing a diisocyanate and an organoclay to form a first mixture;

adding a polyol and a carboxylic acid having hydroxyl functionality in a solvent to form a second mixture;

mixing the first mixture and the second mixture and heating at a temperature in a range of 40-90° C. for 2-6 hours to form a prepolymer with a carboxylic acid group;

mixing a base and the prepolymer with a carboxylic acid group to form a prepolymer with a carboxylic acid salt;

mixing water with the prepolymer with a carboxylic acid salt to form a dispersion; and reacting the dispersion with a diamine as a chain extender to form the waterborne nanocomposite dispersion.

The method summarized above comprises three major steps. Initially, a prepolymer is formed by condensation of diisocynate, polyol, clay and a carboxylic acid containing at least two hydroxyl groups. The carboxylate groups of the prepolymer are neutralized by a base to form a salt of the carboxyl group. The neutralized prepolymer is dispersed in water and treated with diamine compound to complete the polymerization and produces the WBPU/clay nanocomposite. In one embodiment the prepolymer is used as a pre-made composition and the steps of making the prepolymer are an optional step of the method.

The method may utilize any compound having two or more isocyanate groups to prepare the WBPU of the invention, in particular, the isocyanate compounds used for the synthesis of polyurethane polymers. Several known diisothiocyanate and their derivatives are commercially available such as, but not limited to, isophorone diisocyanate, methylene bis-phenyl isocyanate, trimethylene diisocyanate, tetramethylene diisocyanate, hexamethylene diisocyanate, pentamethylene diisocyanate, 1,2-propylene diisocyanate, 2,3-butylene diiso-cyanate, 1,3-butylene diisocyanate, dodecamethylene diisocyanate, 2,4,4-trimethyl-hexamethylene diisocyanate, 4,4'-dicyclohexylmethane diisocyanate, dodecamethylene diisocyanate, 2,4,4-trimethylhexamethylene diisocyanate, 1,3-cyclopentane diisocyanate, 1,3-cyclohexane diisocyanate, 1,4-cyclohexane diiisocyanate, methyl-2,4-cyclohexane diisocyanate, methyl-2,6-cyclohexane diisocyanate, 4,4'-methylene-bis(cyclohexyl isocyanate), 1,4-bis(isocyanate methyl)cyclohexane, 1,4-bis(isocyanate methyl)cyclohexane 1,3-phenylene diisocyanate, 4,4'-diphenyl diisocyanate, 1,4-phenylene diisocyanate, 2,4-tolylene diisocyanate, 2,6-tolylene diisocyanate, 4,4'-toluidine diisocyanate, 2,4,6-triisocyanate toluene, 1,3,5-triisocyanate benzene, dianisidine diisocyanate, 4,4'-diphenyl-ether diisocyanate, 4,4'-triphenylmethane triisocyanate, 1,4-tetramethylxylylene diisocyanate, 1,3-tetramethylxylylene diisocyanate. In a preferred embodiment of the method, 4,4'-dicyclohexylmethane diisocyanate is used.

Similarly, any nanoorganoclay (organoclay) may be used in the method. Nanoclays are nanoparticles of layered mineral silicates. Depending on chemical composition and nanoparticle morphology, nanoclays are generally organized into several classes such as montmorillonite, bentonite, kaolinite, hectorite, and halloysite. Bentonite and montmorillonite clay have high expansion. Montmorillonite is a natural phyllosilicate extracted from bentonite. It belongs to smectite family of expandable 2:1 clay. Montmorillonite can expand several times its original volume, when it comes in contact with water. The layered montmorillonite comprises a layer of edge shared alumina octahedral sheet sandwiched between two silica-tetrahedral sheets. The apical oxygen atoms of the silica tetrahedral sheets are all shared with the octahedral sheet. The alumino-silicate layers of montmorillonite are approximately 1 nm thick with lateral dimension length/width of 200 nm. The primary particle may be from 8 nm to 10 nm in thickness. The montmorillonite in powder form has a particle size from 100 nm to 10 microns. The stacked alumino silicate sheets of montmorillonite, therefore, have a high aspect ratio and plate like morphology. Organoclay is a class of hybrid organic inorganic nanomaterials, which has potential for modifying the rheology of polymers. It is produced by chemically modifying nanoclay to contain an organic moiety, in particular, quaternary ammonium salts. Several preparations of organoclay are commercially available and may be used in the method. The organic modification of the nanoclay increases the clay basal spacing and the distance between the silicate galleries. Examples of some commercial products are Cloisites produced by Southern Clay Products, Inc. Gonzales, Tex. such as Cloisite Nat®, Cloisite 30B®, Cloisite 10A®, Cloisite 25A®, Cloisite 93A®, Cloisite 20A®, Cloisite 20A®, Cloisite 15A®, and Cloisite 6A®. Also commercially available are other organoclays such as SOMASIF™ MAE, SOMASIF™ MEE, SOMASIF™ MPE, SOMASIF™ MTE, SOMASIF™ ME-100; and LUCENTITE™ clays such as LUCENTITE™ SPN, and LUCENTITE™ SWN sold by CO-OP Chemical Co. LTD. Tokyo, Japan. In a preferred embodiment, the organoclay is Cloisite. In a more preferred embodiment, the organoclay used in the method is Cloisite 15A®, Cloisite 30B or mixture thereof from Southern Clay Products, USA. Cloisite 15A® and Cloisite 30B® are modified nanoclay with methyl, tallow (~65% C18, ~30% C16, ~5% C14), bis-2-hydroxyethyl quaternary ammonium chloride. The tallow of Cloisite 15A® is hydrogenated, whereas that of the Cloisite 30B® is not. The nanoclay in the embodiment may be white or off white in color, with a density of 1.98 g/cm$^3$, d-spacing (0011) of 1.85 nm, aspect ratio ranging from 200 to 1000, surface area of 750 m$^2$/g and mean particle size of 6 microns The polyol used in the method may be any organic compound containing two or more hydroxyl groups such as diols, triols, tetraol and the like such as glycol, 1,3-propanediol, 1,4-butanediol, 1,5-pentain diol, 1,6-hexanediol, glycerol, and sugar alcohols including isomers and derivatives thereof having one or more substituents. In some preferred embodiments, the polyol is an oligomer or polymer of any compound comprising at least two hydroxyl groups. Many commercially available oligomers and polymers are available such as, but not limited, to diethylene glycol (DEG), triethylene glycol (TEG), tetraethylene glycol (TETG), polyethylene glycol (PEG), polypropylene glycol (PPG), and polytetramethyleneoxide glycol (PTMEG) and are suitable to be used. In a more preferred embodiment, the polyol is PTMEG, which also known as polytetrahydrofurane or poly1,4-butanediol. It is commercially available with various molecular weights in the range of 250 to 3000 Dalton, preferably in the range of 500 to 2700 Dalton, more preferably in the range 1000 to 2500 Dalton, and even more preferably in the range 1500 to 2000 Dalton. The most preferred PTMEG is PTMEG Mn=2000.

Any carboxylic acid capable of being incorporated into the prepolymer may be used. A preferred embodiment, the carboxylic acid has at least two or more hydroxyl groups to be incorporated into the prepolymer such as, but not limited to, dimethylolpropionic (DMPA), also known as 2,2-bis (hydroxymethyl)propionic acid, 2,2-bis(hydroxymetyl)butyric acid, and 3-hydroxy-2,2bis(hydroxymethyl)propionic acid. The most preferred carboxylic acid is DMPA.

Many bases are well-known in the art may be utilized to neutralize the carboxyl groups of the prepolymer, e.g., alkalimetals hydroxides, ammonia, primary, secondary and tertiary amines, and pyridine. In a preferred embodiment, the base is a tertiary amine such as, but not limited to, trimethylamine, trimethylamine, tributylamine, tripropylamine and isomers thereof. In a preferred embodiment, triethylamine is used.

Similarly, many diamines may be used to complete the polymerization reaction to produce the WBPU/clay nanoparticles, such as but not limited to ethylenediamine, 1,3-propanediamine, 1,4-butanediamine, 1,5-pentaindiamine (also known as cadaverine), 1,6-hexanediamine and isomers and derivatives thereof.

Initially, the diisocyanate is mixed with clay with vigorous mechanical stirring for about 10-60 minutes, preferably about 15-50 minutes, more preferably about 20-40 minutes, and most preferably about 25-35 minutes to form a first mixture. The first mixture is further optionally subjected to ultrasound treatment for about 5-30 minutes, preferably about 10-20 minutes, more preferably about 15 minutes. Similarly, the polyol, the carboxylic acid, and a solvent are mixed together to form a second mixture. Any suitable solvents may be used in the method such as, but not limited to, dimethylformamide (DMF), dimethyl sulfoxide (DMSO), and 1-methyl-2-pyrrolidone (NMP) with NMP is the preferred solvent. The first mixture is mixed with the second mixture to form a reaction mixture. Preferably the first mixture is mixed wadded to the second mixture to form a reaction mixture. The reaction mixture is heated to a temperature in the range of about 45-95° C., preferably about 60-90° C., more preferably about 70-90° C., and most preferably, about 80-85° C. to form the prepolymer. The carboxyl groups of the prepolymer are neutralized by the addition of an equal molar amount of base such as, but not limited to, triethylamine. To the neutralized prepolymer, water is added to about 30-90 wt. %, preferably about 50-85 wt. %, more preferably about 65-75 wt. %, and most preferably about 70 wt. % of the prepolymer weight with vigorous stirring to form a dispersion. Finally, the polymerization reaction is completed by reaction with, e.g., the addition of, a diamino compound such as, but not limited to ethylenediamine.

A second aspect of the invention is WBPU/clay nanocomposite dispersion comprising about 30-90 wt. % water, preferably about 50-80 wt. % water, more preferably about 65-75 wt. % water, and most preferably about 70% water of the total weight of the dispersion. The nanocomposite may have a mean particle size of about 10-99 nm, preferably of about 30-90 nm, more preferably of about 35-85 nm, and most preferably of about 40-80 nm. The WBPU comprises reacted units of a diisocyanate, a polyol, a carboxylic acid salt having at least two hydroxyl functionalities, and a diamine. In some embodiments, the molar ratio of a total number of mols of the polyol, the carboxylic acid having at least two hydroxyl functionality, and the diamine to a number of mols of the diisocyanate is in a range of about 0.8-1.2, preferably about 0.9-1.1; and more preferably 1. Without being limited by any particular isocyanate, the isocyanate used to make WBPU/clay nanocomposite dispersion is selected from the group comprising isophorone diisocyanate, methylene bis-phenyl isocyanate, hexamethylene diisocyanate, and 4,4'-dicyclohexylmethane diisocyanate. The most preferred diisocyanate is 4,4'-dicyclohexylmethane diisocyanate. In some other embodiments, the mol % of the carboxylic acid with at least two hydroxyl group is in the range of about 8-30 mol %, more preferably about 15-25 mol %, and most preferably about 20-24 mol %.

In a preferred embodiment, the WBPU/clay nanocomposite dispersion comprises an organoclay in an amount in the range of about 0.05-10.0 wt. % of the nanocomposite, preferably about 0.1-5.0 wt. %, preferably about 0.5-4.0 wt. %, more preferably about 1.0-3.0 wt. %, and most preferably about 2.0-2.5 wt. % relative to a total weight of the nanocomposite. Without being limited to a particular organoclay, a preferred organoclay is Cloisite, more preferably Cloisite 15A® or Cloisite 30B®.

In another embodiment, the waterborne nanocomposite dispersion of has a zeta potential in the range of −0.60 to −0.10 mV, preferably in the range of −0.55 to −0.25 mV, more preferably in the range of −0.50 to −0.20 mV, even more preferably in the range of −0.50- to −0.30 mV, and most preferably in the range of −0.45 to −0.38. In a particular preferred embodiment, the waterborne nanocomposite dispersion of has a zeta potential in the range of about −044 to −0.40.

In another embodiment, the waterborne nanocomposite dispersion has a shelf time in the range of about 20 to 600 days, preferably in the range of about 80 to 500 days, more preferably of about 150-400 months, and most preferably in the range of about 250 to 370 days.

Another embodiment, the waterborne nanocomposite dispersion has a particle size in the range of about 25 to 99 nm, preferably in the range of about 30 to 75 nm, more preferably in the range of about 35 to 50 nm, and most preferably in the range of about 40 to 45 nm.

Another embodiment, the waterborne nanocomposite dispersion has a viscosity in the range 70-550 cP, preferably 80-460 cP, more preferably 90-300 cP, and most preferably 100-200 cP at rpm in the range of 300 to 400.

Example 1

Materials and Methods:
Materials:
Poly(tetramethyleneoxide glycol, PTMG Mn=2000, Sigma Aldrich) dried under vacuum at 90° C. and 1-2 mmHg for 3 h before use. Triethylamine (TEA; Junsei Chemical, Tokyo, Japan), 1-methyl-2-pyrrolidone (Junsei Chemical), 4,4-dicyclohexylmethane diisocyanate ($H_{12}$MDI, Aldrich Chemical), and ethylene diamine (EDA, Junsei Chemical) were used after dehydration in 4-A molecular sieves for 1 week. Dibutyltin dilaurate (Aldrich Chemical) and dimethylol propionic acid (DMPA), also known as 2,2-bis(hydroxydimethyl) propionic acid, were used without further purification. Organoclay Cloisite 15A® and Cloisite®30B° were donated by Southern Clay Products (Gonzales, Tex., USA).
Methods:
FTIR spectroscopy (Impact 400D, Nicolet, Madison, Wis.) was used to identify the polymer and polymer/nanocomposite dispersions. The dispersion was coated on a thallium bromide/thallium iodide crystal surface as a thin liquid film and dried for analysis. For each sample, 32 scans at a resolution of 4 $cm^{-1}$ were collected in transmittance mode. The wide-angle X-ray diffraction (WAXD) patterns were recorded using a Philips Xpert XRD System diffractometer at a voltage of 40 kV and a radiation of wavelength 1.542 Å. Diffraction patterns were obtained in the range of Bragg's angle 2θ=0°-40°. The 2θ scan rate was 2 degree/min. TEM images were obtained using a CM 200 microscope (Philips, Eindhoven, The Netherlands) at an accelerated voltage of 120 kV. Ultrathin sections were prepared at 130° C. using a UCT ultramicrotome equipped with an FCS cryochamber (both from Leica Microsystems GmbH, Wetzlar, Germany). A Malvern Zetasizer 3000 zeta potential analyzer was used to measure the zeta potential of the dispersions at 25° C. The mean particle size and particle size distribution (PSD) of the dispersions were measured using laser scattering equipment (Autosizer, Malvern IIC, Malvern, Worcester, UK). A small amount of dispersion was added to a deionized water tank. This was followed by setting the aperture at 200 μm. The average particle diameters were measured at 25° C. The dispersion viscosity was measured at 25° C. from 0 to 400 rpm with spindle number 4 (Brookfield LVDV-II+ digital viscometer, Brookfield, Middleboro, Mass., USA).

Preparation of Films:
Pristine WBPU and WBPU/clay nanocomposite films were prepared by pouring the aqueous dispersions onto Teflon disks, and dried at ambient temperature for 48 h. The approximately 0.5 mm thick films were dried in vacuum at 50° C. for 1 day and stored in a desiccator at room temperature.

Storage of WBPU/Clay Nanocomposite Dispersion:
The dispersions were kept in a glass bottle and stored at ambient conditions. The stability of the dispersions was monitored visually.

Example 2

Preparation of Pristine WBPU Dispersion:
All pristine WBPU dispersions were prepared as described in our previous report [Rahman et al. "Synthesis and Characterization of Waterborne Polyurethane/Clay Nanocomposite-Effect on Adhesive Strength." *Macromol. Symp.* 249-250 251-258 (2006)]. PTMG was degassed under vacuum at 90° C. for 30 min in a four necked separating flask equipped with a thermometer, a stir bar, a heat jacket, a thy nitrogen inlet, and a condenser with a drying tube. DMPA/NMP (1/1 w/w) was added to the flask and allowed to cool to 45° C. with moderate stirring (175-200 rpm). $H_{12}$MDI was added to the flask and heated to 85° C. with the same stirring rate (175-200 rpm). The reaction was allowed to continue at these conditions for 3 h. The change in the NCO value during the reaction was determined by the standard dibutylamine back titration method (ASTM D 1638). Methyl ethyl ketone (MEK, 10 wt. %) was added to the NCO-terminated prepolymer mixture to adjust the solution viscosity. TEA was added to the reaction mixture to neutralize the carboxyl group of the NCO-terminated prepolymer. After 30 min of neutralization, distilled water (70 wt. %) was added to the reaction mixture with vigorous stirring (1300-1500 rpm). The resulting dispersion was chain extended by dropwise addition of aqueous solution of EDA at 40° C. for 1 h. The reaction was allowed to continue until the NCO peak (2260-2280 $cm^{-1}$) in the IR spectra disappeared. The final WBPU dispersions (30 wt. % solid content) were obtained after evaporation of the MEK.

Example 3

Method A for Preparation of WBPU/Clay Nanocomposite Dispersions:

WBPU/clay nanocomposite dispersions were also prepared by a prepolymer mixing method and all samples have 30% solid content (see Tables 1 and 2. PTMG was placed in a four necked flask equipped with a thermometer, a stirrer, a heat jacket, an inlet of dry nitrogen, and a condenser with a drying tube. It was degassed in vacuum at 90° C. for 30 min. DMPA/NMP (1/1 w/w) was added to the flask and allowed to cool to 45° C. with moderate stirring (175-200 rpm). Clay and $H_{12}MDI$ were mixed in another vessel at 300 rpm with a mechanical stirrer at room temperature for approximately 30 min. This mixture was added to the first mixture at 45° C. and heated to 85° C. with similar stirring rate (175-200 rpm). When using Cloisite 30B®, 0.5 mol % excess $H_{12}MDI$ was used. The reaction was allowed to continue under these conditions for 3 h. The change in the NCO value during the reaction was determined with the standard dibutylamine back titration method (ASTM D 1638). Then, methyl ethyl ketone (MEK, 10 wt. %) was added to the NCO-terminated prepolymer mixture to adjust the viscosity of the reaction mixture. TEA was added to the reaction mixture to neutralize the carboxyl group of the NCO-terminated prepolymer. After 30 min of neutralization, distilled water (70 wt. %) was added to the reaction mixture with vigorous stirring (1300-1500 rpm). The dispersion was chain extended by EDA (with water) at 40° C. for 1 h. The reaction continued until the NCO peak (2270 cm$^{-1}$) in the IR spectrum completely disappeared. After evaporation of MEK (collected separately), WBPU/clay nanocomposite dispersions were obtained.

TABLE I

Sample designation, composition, stability, shelf life, zeta potential and particle size of WBPU/clay nanocomposite dispersions using Cloisite 15A at various DMPA content

| Sample Designation | Composition (molar ratio) | | | | | DMPA (mol %) | Clay (wt %) | Stability | Shelf life (day) | Zeta potential (mv) | Particle size (nm) |
| --- | --- | --- | --- | --- | --- | --- | --- | --- | --- | --- | --- |
| | PTMG | DMPA | $H_{12}MDI$ | TEA | EDA | | | | | | |
| WBPU10-0 | 5.25 | 2.70 | 13.45 | 2.70 | 5.50 | 10.04 | 0.0 | Stable | 90 | −0.21 | 88 |
| WBPU10-15A | 5.25 | 2.70 | 13.45 | 2.70 | 5.50 | 10.04 | 0.50 | Unstable | — | — | — |
| WBPU11-0 | 5.25 | 3.00 | 13.75 | 3.00 | 5.50 | 10.91 | 0.0 | Stable | 100 | −0.25 | 76 |
| WBPU11-15A1 | 5.25 | 3.00 | 13.75 | 3.00 | 5.50 | 10.91 | 0.50 | Stable | 25 | −0.21 | 78 |
| WBPU11-15A2 | 5.25 | 3.00 | 13.75 | 3.00 | 5.50 | 10.91 | 1.00 | Unstable | — | — | — |
| WBPU12-0 | 5.25 | 3.60 | 14.35 | 3.60 | 5.50 | 12.54 | 0.00 | Stable | 130 | −0.28 | 72 |
| WBPU12-15A1 | 5.25 | 3.60 | 14.35 | 3.60 | 5.50 | 12.54 | 0.50 | Stable | 47 | −0.25 | 74 |
| WBPU12-15A2 | 5.25 | 3.60 | 14.35 | 3.60 | 5.50 | 12.54 | 1.00 | Stable | 20 | −0.21 | 76 |
| WBPU12-15A3 | 5.25 | 3.60 | 14.35 | 3.60 | 5.50 | 12.54 | 1.50 | Unstable | — | — | — |
| WBPU17-0 | 5.25 | 5.60 | 16.35 | 5.60 | 5.50 | 17.13 | 0.00 | Stable | 170 | −0.33 | 57 |
| WBPU17-15A1 | 5.25 | 5.60 | 16.35 | 5.60 | 5.50 | 17.13 | 0.50 | Stable | 80 | −0.32 | 58 |
| WBPU17-15A2 | 5.25 | 5.60 | 16.35 | 5.60 | 5.50 | 17.13 | 1.00 | Stable | 57 | −0.29 | 61 |
| WBPU17-15A3 | 5.25 | 5.60 | 16.35 | 5.60 | 5.50 | 17.13 | 1.50 | Stable | 30 | −0.25 | 63 |
| WBPU17-15A4 | 5.25 | 5.60 | 16.35 | 5.60 | 5.50 | 17.13 | 2.00 | Unstable | — | — | — |
| WBPU20-0 | 5.25 | 7.60 | 18.35 | 7.60 | 5.50 | 20.71 | 0.00 | Stable | 260 | −0.43 | 44 |
| WBPU20-15A1 | 5.25 | 7.60 | 18.35 | 7.60 | 5.50 | 20.71 | 0.50 | Stable | 240 | −0.42 | 45 |
| WBPU20-15A2 | 5.25 | 7.60 | 18.35 | 7.60 | 5.50 | 20.71 | 1.00 | Stable | 235 | −0.38 | 46 |
| WBPU20-15A3 | 5.25 | 7.60 | 18.35 | 7.60 | 5.50 | 20.71 | 1.50 | Stable | 231 | −0.35 | 48 |
| WBPU20-15A4 | 5.25 | 7.60 | 18.35 | 7.60 | 5.50 | 20.71 | 2.00 | Stable | 223 | −0.29 | 49 |
| WBPU20-15A5 | 5.25 | 7.60 | 18.35 | 7.60 | 5.50 | 20.71 | 2.50 | Stable | 7 | — | — |
| WBPU23-0 | 5.25 | 9.60 | 20.35 | 7.60 | 5.50 | 23.58 | 0.00 | Stable | 310 | −0.54 | 41 |
| WBPU23-15A1 | 5.25 | 9.60 | 20.35 | 7.60 | 5.50 | 23.58 | 0.50 | Stable | 287 | −0.53 | 42 |
| WBPU23-15A2 | 5.25 | 9.60 | 20.35 | 9.60 | 5.50 | 23.58 | 1.00 | Stable | 271 | −0.49 | 42 |
| WBPU23-15A3 | 5.25 | 9.60 | 20.35 | 9.60 | 5.50 | 23.58 | 1.50 | Stable | 254 | −0.46 | 43 |
| WBPU23-15A4 | 5.25 | 9.60 | 20.35 | 9.60 | 5.50 | 23.58 | 2.00 | Stable | 231 | −0.37 | 45 |
| WBPU23-15A5 | 5.25 | 9.60 | 20.35 | 9.60 | 5.50 | 23.58 | 2.50 | Stable | 210 | −0.31 | 46 |
| WBPU23-15A6 | 5.25 | 9.60 | 20.35 | 9.60 | 5.50 | 23.58 | 3.00 | Stable | 16 | −0.26 | 65 |
| WBPU26-0 | 5.25 | 11.60 | 22.35 | 11.60 | 5.50 | 26.00 | 0.00 | Stable | 312 | −0.52 | 43 |
| WBPU26-15A1 | 5.25 | 11.60 | 22.35 | 11.60 | 5.50 | 26.00 | 0.50 | Stable | 25 | −0.31 | 67 |
| WBPU26-15A2 | 5.25 | 11.60 | 22.35 | 11.60 | 5.50 | 26.00 | 1.00 | Stable | 6 | −0.24 | 82 |
| WBPU26-15A3 | 5.25 | 11.60 | 22.35 | 11.60 | 5.50 | 26.00 | 1.50 | Unstable | — | — | — |

TABLE 2

Sample designation, composition, stability, shelf life, zeta potential and particle size of WBPU/clay nanocomposite dispersions using Cloisite 30B at various DMPA content

| Sample Designation | Composition (molar ratio) | | | | | DMPA (mol %) | Clay (wt %) | Stability | Shelf life (day) | Zeta potential (mv) | Particle size (nm) |
| --- | --- | --- | --- | --- | --- | --- | --- | --- | --- | --- | --- |
| | PTMG | DMPA | $H_{12}MDI$ | TEA | EDA | | | | | | |
| WBPU10-0 | 5.25 | 2.70 | 13.45 | 2.70 | 5.50 | 10.04 | 0.0 | Stable | 90 | −0.21 | 88 |
| WBPU10-30B | 5.25 | 2.70 | 13.45 | 2.70 | 5.50 | 10.04 | 0.50 | Unstable | — | — | — |
| WBPU11-0 | 5.25 | 3.00 | 13.75 | 3.00 | 5.50 | 10.91 | 0.0 | Stable | 100 | −0.25 | 76 |
| WBPU11-30B1 | 5.25 | 3.00 | 13.75 | 3.00 | 5.50 | 10.91 | 0.50 | Stable | 27 | −0.22 | 78 |
| WBPU11-30B2 | 5.25 | 3.00 | 13.75 | 3.00 | 5.50 | 10.91 | 1.00 | Unstable | — | — | — |
| WBPU12-0 | 5.25 | 3.60 | 14.35 | 3.60 | 5.50 | 12.54 | 0.00 | Stable | 130 | −0.28 | 72 |

TABLE 2-continued

Sample designation, composition, stability, shelf life, zeta potential and particle size of WBPU/clay nanocomposite dispersions using Cloisite 30B at various DMPA content

| Sample Designation | Composition (molar ratio) | | | | | DMPA (mol %) | Clay (wt %) | Stability | Shelf life (day) | Zeta potential (mv) | Particle size (nm) |
|---|---|---|---|---|---|---|---|---|---|---|---|
| | PTMG | DMPA | H$_{12}$MDI | TEA | EDA | | | | | | |
| WBPU12-30B1 | 5.25 | 3.60 | 14.35 | 3.60 | 5.50 | 12.54 | 0.50 | Stable | 51 | −0.26 | 73 |
| WBPU12-30B2 | 5.25 | 3.60 | 14.35 | 3.60 | 5.50 | 12.54 | 1.00 | Stable | 23 | −0.23 | 75 |
| WBPU12-30B3 | 5.25 | 3.60 | 14.35 | 3.60 | 5.50 | 12.54 | 1.50 | Unstable | — | — | — |
| WBPU17-0 | 5.25 | 5.60 | 16.35 | 5.60 | 5.50 | 17.13 | 0.00 | Stable | 170 | −0.33 | 57 |
| WBPU17-30B1 | 5.25 | 5.60 | 16.35 | 5.60 | 5.50 | 17.13 | 0.50 | Stable | 95 | −0.32 | 58 |
| WBPU17-30B2 | 5.25 | 5.60 | 16.35 | 5.60 | 5.50 | 17.13 | 1.00 | Stable | 67 | −0.30 | 60 |
| WBPU17-30B3 | 5.25 | 5.60 | 16.35 | 5.60 | 5.50 | 17.13 | 1.50 | Stable | 34 | −0.27 | 62 |
| WBPU17-30B4 | 5.25 | 5.60 | 16.35 | 5.60 | 5.50 | 17.13 | 2.00 | Unstable | — | — | — |
| WBPU20-0 | 5.25 | 7.60 | 18.35 | 7.60 | 5.50 | 20.17 | 0.00 | Stable | 260 | −0.43 | 44 |
| WBPU20-30B1 | 5.25 | 7.60 | 18.35 | 7.60 | 5.50 | 20.17 | 0.50 | Stable | 251 | −0.42 | 45 |
| WBPU20-30B2 | 5.25 | 7.60 | 18.35 | 7.60 | 5.50 | 20.71 | 1.00 | Stable | 246 | −0.39 | 46 |
| WBPU20-30B3 | 5.25 | 7.60 | 18.35 | 7.60 | 5.50 | 20.71 | 1.50 | Stable | 242 | −0.36 | 47 |
| WBPU20-30B4 | 5.25 | 7.60 | 18.35 | 7.60 | 5.50 | 20.71 | 2.00 | Stable | 239 | −0.31 | 48 |
| WBPU20-30B5 | 5.25 | 7.60 | 18.35 | 7.60 | 5.50 | 20.71 | 2.50 | Stable | 10 | — | — |
| WBPU23-0 | 5.25 | 9.60 | 20.35 | 7.60 | 5.50 | 23.58 | 0.00 | Stable | 310 | −0.54 | 41 |
| WBPU23-30B1 | 5.25 | 9.60 | 20.35 | 7.60 | 5.50 | 23.58 | 0.50 | Stable | 297 | −0.53 | 42 |
| WBPU23-30B2 | 5.25 | 9.60 | 20.35 | 9.60 | 5.50 | 23.58 | 1.00 | Stable | 280 | −0.51 | 42 |
| WBPU23-30B3 | 5.25 | 9.60 | 20.35 | 9.60 | 5.50 | 23.58 | 1.50 | Stable | 262 | −0.48 | 43 |
| WBPU23-30B4 | 5.25 | 9.60 | 20.35 | 9.60 | 5.50 | 23.58 | 2.00 | Stable | 238 | −0.41 | 44 |
| WBPU23-30B5 | 5.25 | 9.60 | 20.35 | 9.60 | 5.50 | 23.58 | 2.50 | Stable | 216 | −0.35 | 45 |
| WBPU23-30B6 | 5.25 | 9.60 | 20.35 | 9.60 | 5.50 | 23.58 | 3.00 | Stable | 16 | −0.29 | 55 |
| WBPU26-0 | 5.25 | 11.60 | 22.35 | 11.60 | 5.50 | 26.00 | 0.00 | Stable | 312 | −0.52 | 43 |
| WBPU26-30B1 | 5.25 | 11.60 | 22.35 | 11.60 | 5.50 | 26.00 | 0.50 | Stable | 26 | −0.32 | 66 |
| WBPU26-30B2 | 5.25 | 11.60 | 22.35 | 11.60 | 5.50 | 26.00 | 1.00 | Stable | 6 | −0.24 | 80 |
| WBPU26-30B3 | 5.25 | 11.60 | 22.35 | 11.60 | 5.50 | 26.00 | 1.50 | Unstable | — | — | |

Example 4

Method B for Preparation of WBPU/Clay Nanocomposite Dispersions:

In this method clay and H$_{12}$MDI were premixed with 150-rpm mechanical stirring at room temperature for 30 min. After premixing, ultrasound (BRANSON 2510, USA) was applied to the mixture for an additional 15 min. A cooling system was not used during sonication because no appreciable temperature difference was observed. The mixture was added to the rest of the reactant and processed as described in example 3.

TABLE 3

Sample designation, composition, stability, shelf life, zeta potential and particle size of WBPU/clay nanocomposite dispersions prepared by mechanical forces (sonication)*

| Sample Designation | Composition (molar ratio) | | | | | DMPA (mol %) | Clay (wt %) | | Stability | Shelf life (day) | Zeta potential (mv) | Particle size (nm) |
|---|---|---|---|---|---|---|---|---|---|---|---|---|
| | PTMG | DMPA | H$_{12}$MDI | TEA | EDA | | 15A | 30B | | | | |
| WBPU20-15A4-M | 5.25 | 7.60 | 18.35 | 7.60 | 5.50 | 20.71 | 2.00 | — | Stable | 263 | −0.29 | 47 |
| WBPU20-30B4-M | 5.25 | 7.60 | 18.35 | 7.60 | 5.50 | 20.71 | — | 2.00 | Stable | 355 | −0.40 | 45 |
| WBPU23-15A5-M | 5.25 | 9.60 | 20.35 | 9.60 | 5.50 | 23.58 | 2.50 | — | Stable | 260 | −0.31 | 45 |
| WBPU23-30B5-M | 5.25 | 9.60 | 20.35 | 9.60 | 5.50 | 23.58 | — | 2.50 | Stable | 351 | −0.43 | 41 |
| WBPU26-15A1-M | 5.25 | 11.60 | 22.35 | 11.60 | 5.50 | 26.00 | 0.50 | — | Stable | 25 | −0.31 | 67 |
| WBPU26-30B1-M | 5.25 | 11.60 | 22.35 | 11.60 | 5.50 | 26.00 | — | 0.50 | Stable | 26 | −0.32 | 66 |

*The solid content of all samples: 30 wt %

Example 5

Figure 2:
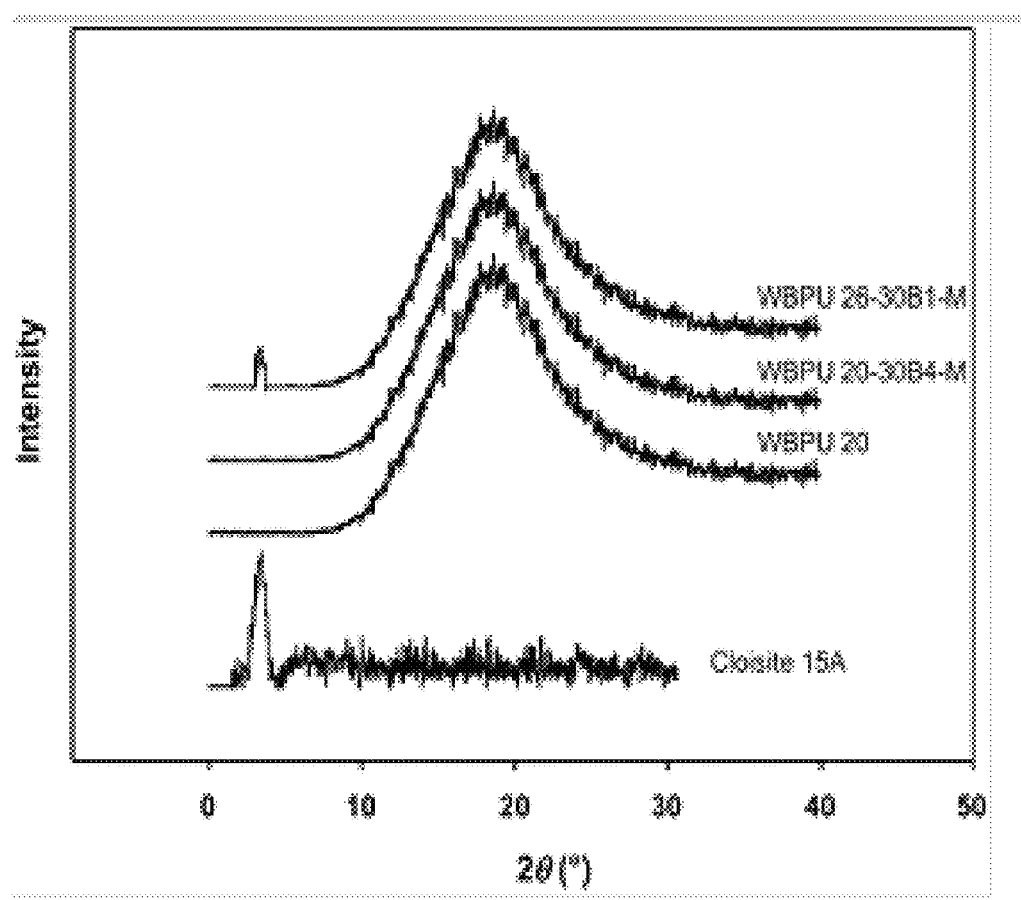
FIG. 2 shows XRD patterns of WBPU/clay nanocomposite films.

Synthesis and Identification:

The sample designation, composition, stability, and storage time of the WBPU/clay nanocomposite dispersions are shown in Tables 1 and 2. Three primary aspects affected the stability and storage time of WBPU/clay nanocomposite dispersions. They are: (a) carboxyl acid salt content and clay content, (b) clay surface structure (using Cloisite 15A® and Cloisite 30B® clays), and (c) method of making the nanocomposite. In method A, a conventional system is used to prepare nanocomposite dispersions. In method B, sonication is used during mixing the clay and diisocyanate as an additional mechanical force (Table 3). All dispersions were prepared using a prepolymer method. In this fashion, the NCO-terminated prepolymer was obtained by the reaction of PTMG, DMPA, and H$_{12}$MDI. The carboxylic group in the prepolymer was neutralized by TEA, and water was added for dispersion. Finally, the unreacted NCO group reacted with the amine group of EDA to complete the chain extension of polyurethane. The absence of a peak in the range of 2000-2300 cm$^{-1}$ indicated that all of the isocyanate groups in this system reacted (see FIG. 1). The WBPU and WBPU/clay nanocomposite dispersions were identified by characteristic IR peaks at 1710 cm$^{-1}$ and 3430 cm$^{-1}$ for C=O groups and N—H groups, respectively. The spectra also show other characteristic peaks for polyurethane at 2795, 1540, 1110, and 766 cm$^{-1}$. XRD is used to determine the clay dispersion state (exfoliated/intercalated) in the prepared nanocomposite films. The typical XRD patterns of nanocomposites are shown in FIG. 2. All the patterns exhibited a broad diffraction halo at 2θ=19.3°, which was similar to conventional WBPU. In most cases, the characteristic peaks of the clay Cloisite 15A® or Cloisite 30B® have completely disappeared, which indicated that mostly clay platelets were exfoliated in the nanocomposite matrices [Rahman et al. "Synthesis and Characterization of Waterborne Polyurethane/Clay Nanocomposite-Effect on Adhesive Strength." *Macromol. Symp.* 249-250 251-258 (2006); and Huh et al. "Properties of Waterborne Polyurethane/Clay Nanocomposite Adhesive." *J. Adhes. Sci. Technol.* 23 739-751 (2009)]. However, there was a minor peak recorded at 3° for dispersions that were prepared using 26 mol % DMPA. This implies intercalated nanocomposite dispersions when the DMPA content was above 23.58 mol %.

Stability of Dispersion:

As used herein the term "stable dispersion" refers to a dispersion composition that shows no precipitation or phase separation within two days of preparation. Only stable WBPU/clay nanocomposite dispersions and their respective films for characterization are considered. Here, the stability of dispersions is based on phase separation. The unstable dispersions either changed to gels, showed some segmentation (precipitation) after preparation, or phase separated within 2 days of preparation. It is generally accepted that a minimum DMPA content is required for formation of stable conventional WBPU dispersions [Chattopadhyay et al. "Structural Engineering of Polyurethane Coatings for High Performance Applications." *Prog. Polym. Sci.* 32 352-418 (2007); and Lee et al. "Effects of Ionic Interactions between Clay and Waterborne Polyurethanes on the Structure and Physical Properties of their Nanocomposite Dispersions." *J. Polym. Sci. A Polym. Chem.* 44 5801-5807 (2006)]. In this study, minimum DMPA content of 10.04 mol % is required to obtain stable conventional WBPU dispersion, and no fixed DMPA content is required to obtain stable WBPU/clay nanocomposite dispersions. The minimum DMPA content for stable WBPU/clay nanocomposite dispersions was always higher than 10.04 mol %. Additionally, a higher DMPA content was required to obtain stable WBPU/clay nanocomposite dispersions when the clay content increased (see Table 1). In addition, the WBPU/clay nanocomposite dispersions are unstable above a certain percentage of clay content in each series. The storage time indicates that the dispersion was stable without any precipitation or phase separation up to that time. Stable dispersions are observed up to 26.0 mol % DMPA. Above 26.0 mol % DMPA, the dispersion becomes unstable with very low clay content of 0.5 wt. %. It should be noted that the nanocomposite dispersion is stable at 26 mol % DMPA at low clay content of 1.0 wt. % or less, but the storage time of the dispersion is only 21 days. In contrast, nanocomposite dispersion comprising 2.5 wt. % of clay and 23.58 mol % displays the highest stability and the longest storage time. It is well known that a stable WBPU dispersion consists of double layers of positive and negative ion particles, which generate electrostatic forces that stabilize the dispersion [Lee et al. "Effects of Ionic Interactions Between Clay and Waterborne Polyurethanes on the Structure and Physical Properties of their Nanocomposite Dispersions." *J. Polym. Sci. A Polym. Chem.* 44 5801-5807 (2006)]. Modified organoclay has an extended anionic layer, which is balanced by quaternary ammonium cations in the interlayer galleries. When the clay is dispersed in WBPU/clay nanocomposite dispersion, the organoclay interacts with polyurethane particles [Lee et al (2006) and Chinwanticharoen et al. "Preparation and Shelf-Life Stability of Aqueous Polyurethane Dispersions." *Macromol. Symp.* 216 229-239 (2004)]. Thus, the electrostatic force of particles can be altered. The direct impact of this interaction is on the dispersion stability and storage time of the WBPU/clay nanocomposite dispersions (see Table 1). Also, the stability and storage time of the nanocomposite dispersions are dependent on the clay surface structure. When the reactants are maintained at constant ratio, the storage times of the nanocomposite dispersions comprising Cloisite 30B are longer than those comprising Cloisite 15A. Also, the storage time is improved by the sonication treatment (method B). The WBPU20-30B4-M and WBPU23-30B5-M dispersions showed excellent stability with long storage time of about 12 months compared to all other dispersions.

Tem Analysis:

TEM is the most effective method for evaluating clay agglomeration in nanocomposite dispersions. The particles are spherical with similar size in all pristine WBPU dispersions, and are mixtures of different sizes in all WBPU/clay nanocomposite dispersions. Clays are mostly surrounding PU particles. Different attachment is observed when the sonicated WBPU/Cloisite 30B® nanocomposites dispersion is prepared at DMPA content of 20.17 and 23.58 mol %. The clays are mostly encapsulated in PU particles. The different states of clay dispersion in series WBPU5 are shown in FIG. 3. FIG. 3*a* (WBPU20-0) illustrates a conventional dispersion. The particles are spherical and free of any coagulation. In FIG. 3*c* (WBPU20-15A4), two types of particles are found. Some particle sizes are similar to those in the mother WBPU dispersion, whereas others are somewhat larger. Larger mean particle size implies that clays are attached to polyurethane particles. In FIG. 3*b* (WBPU20-15A5), the clays are mostly separated from the polyurethane particles. Thus, phase separation is observed in preparation of WBPU20-15A5 dispersion within 7 days. In FIG. 3*d*, WBPU20-30B4-M shows little difference in the attachment of clays to polyurethane particles when compared to the other samples. Most of the clays were encapsulated, whereas few surrounded the polyurethane particle surfaces. Thus, the interaction between the clay platelets and polyurethane particles is different for this sample than for other dispersions and granted a longer storage time. The observation of encapsulated clay in polymers in this study is similar to the result reported by Bhanvase et al. ["Synthesis of Exfoliated Poly(styrene-co-methyl methacrylate)/Montmorillonite Nanocomposite Using Ultrasound Assisted In Situ Emulsion Copolymerization." *Chem. Eng. J.* 181-182 770-778 (2012)].

Figure 4A:
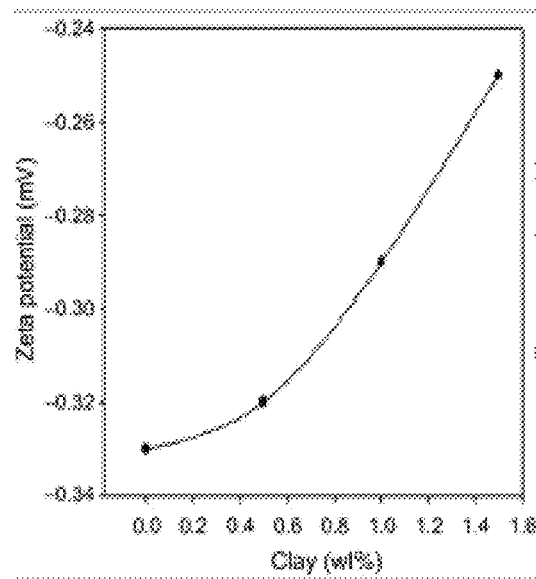
FIG. 4a shows typical zeta potential value of WBPU/clay nanocomposite dispersion with various clay content and 17.13 mol % DMPA.
Figure 4B:
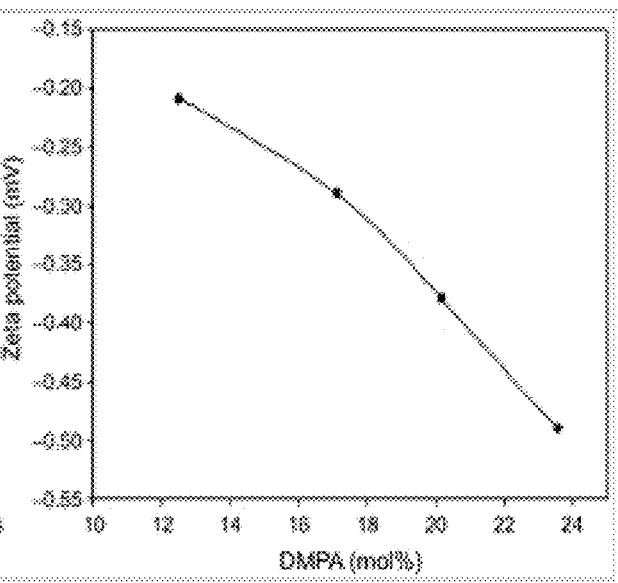
FIG. 4b shows typical zeta potential value of WBPU/clay nanocomposite dispersion with various DMPA content and 1 wt. % clay content.

Zeta Potential Analysis:

The stability of WBPU/clay nanocomposite dispersion can be described by its zeta potential [Lee et al. "Effects of Ionic Interactions Between Clay and Waterborne Polyurethanes on the Structure and Physical Properties of their Nanocomposite Dispersions." *J. Polym. Set. A Polym. Chem.* 44, 5801-5807 (2006)]. All of the dispersion pH values were measured, and were similar. Commonly, the zeta potential is an index of dispersion stability [Lee et al. (2006)]. The zeta potentials of each series are summarized in Tables 1, 2, and 3. For pristine WBPU dispersions, the zeta potential values decreased with increasing DMPA content. This trend continues up to 23.58 mol % DMPA. Above 23.58 mol % of DMPA small decrease in the zeta potential value is observed. In contrast, the zeta value is dependent on several factors for WBPU/clay nanocomposite dispersions. Nanocomposites having up to 23.58 mol % DMPA, the zeta potential value is affected by DMPA, clay contents, clay surface structures, and mechanical forces. It increased (a less negative value) with increasing clay content in each series. The zeta potential increase is less affected above 17.13 mol % DMPA. The zeta potential value increases by 0.1 mV with the addition of 0.5 wt. % Cloisite 15A° at DMPA content of 17.13, 20.35, and 23.58 mol %. Above 23.58 mol % DMPA, the zeta potential values are dependent only on clay content. It becomes much less negative at a clay content of 0.5 wt. % and 1.0 wt. %. For example, the zeta potential measured −0.25 with only 0.5 wt. % clay content compared −0.33 without clay (FIG. 4).

The nanocomposite dispersion with Cloisite 30B® which contains hydroxyl groups at the surface displays a decreased zeta potential indicating higher stability compared to the dispersion with Cloisite 15A® (see Table 1) at a fixed DMPA up to 23.58 mol % and clay content. This could be due to the unreacted polar hydroxyl group of Cloisite 30B® in the dispersions [Huh et al. "Properties of Waterborne Polyurethane/Clay Nanocomposite Adhesive." *J. Adhes. Sci. Technol.* 23 739-751 (2009). Above 23.58 mol % DMPA, the effect of the clay surface structure was minimal. The zeta potential values were almost the same using either Cloisite 15A® or Cloisite 30B® clays. Although the Cloisite 30B® has unreacted OH groups, the heterogeneous or intercalated (from XRD) clay dispersion caused the zeta potential differences.

Up to 23.58 mol % DMPA, the nanocomposite dispersion prepared by method B was also more stable than the one prepared by method A. This was reflected in their zeta potential values. The zeta potential value is lower indicating higher stability for nanocomposite dispersion prepared by method B than those prepared by method A at the same clay and DMPA content (up to 23.58 mol %). This can be ascribed to a more homogeneous distribution of tiny clay particles in the dispersion prepared by method B [Bhanvase et al. "Synthesis of Exfoliated Poly(styrene-co-methyl methacrylate)/-Montmorillonite Nanocomposite Using Ultrasound Assisted In Situ Emulsion Copolymerization." *Chem. Eng. J.* 181-482, 770-778 (2012)]. Above 23.58 mol % DMPA, the effect of mechanical forces was minimal. The sonicated and unsonicated dispersions have almost the same zeta potential values using either Cloisite 15A® or Cloisite 30B®. In contrast, sonication has a strong effect on homogeneous particle distribution as the mechanical force is insufficient to distribute the particles homogeneously due to particles cluster formation.

The magnitude of the zeta potential is an indication of the repulsive force of the particles and can be used to predict the long-term stability of the dispersion. The higher zeta potential values imply that the particle charge increased and repelled more effectively as the carboxyl acid salt content increases up to 23.58 mol % DMPA, when Cloisite 30B® and mechanical forces is used leading increased stability.

However, if the particles have a low zeta potential (small negative or positive value), then there are no forces to prevent the particles from coming together and eventually making the dispersion unstable (flocculation). In this study, the particle charge increased (as the magnitude of the zeta potential value increased) by increasing carboxyl acid salt content and was found to be a maximum at 23.58 mol % DMPA. However, the magnitude of the zeta potential decreasing with increasing clay content implies that the magnitude of the particle charge decreased, which caused flocculation (an unstable dispersion). In each series, the flocculation appeared above a certain clay content (confirmed by a lower zeta potential) and made the dispersion unstable within a very short time (2 days). Up to 23.58 mol % DMPA, the flocculation appeared after a considerable time. Notably, using Cloisite 30B® and applying sonication both strongly resisted flocculation. This was reflected in the WBPU5-30B4-M dispersion, which showed the lowest zeta potential value among all the dispersions. This implies that the combination of a certain carboxyl acid salt group content (23.58 mol %), Cloisite 30B®, and sonication (tiny clay particles) caused this dispersion to have the longest storage time. Above 23.58 mol % DMPA, the flocculation appeared within 3 weeks even at lower clay content (1.0 wt. %).

Analysis of Size and Distribution:

The stability of WBPU/clay nanocomposite dispersions can be described by their mean particle size and distribution (PSD). Usually, dispersions with smaller mean particle size and monomodal PSD have better stability [Chinwanticharoen et al. "Preparation and Shelf-Life Stability of Aqueous Polyurethane Dispersions." *Macromol. Symp.* 216 229-239 (2004); and Huh et al. "Properties of Waterborne Polyurethane/Clay Nanocomposite Adhesive." *J. Adhes. Sci. Technol.* 23 739-751 (2009)]. The dispersion mean particle sizes are summarized in Tables 1, 2, and 3. For pristine WBPU dispersions, the mean particle size decreases with increasing DMPA content. This is due to an increase in ionic groups, which increases the hydrodynamic volume of the particles, and hence, decreases the mean particle size. At 26 mol % DMPA nanodispersion, the decrease in the mean particle size is small. This may be due to the higher amount of DMPA being able to form ionic clusters. All of the dispersions have monomodal PSD, and broader distribution is observed at lower DMPA content (see FIG. 6b).

Figure 5A:
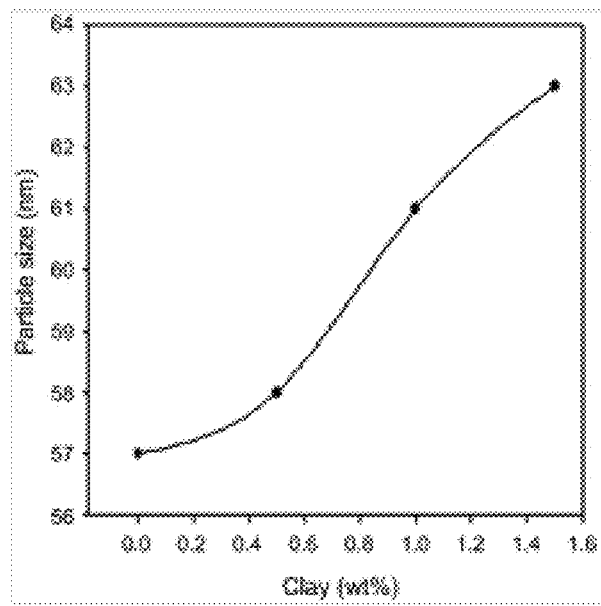
FIG. 5a shows Particle size of WBPU/clay nanocomposite dispersions with various clay content and 17.13 mol % DMPA.
Figure 5B:
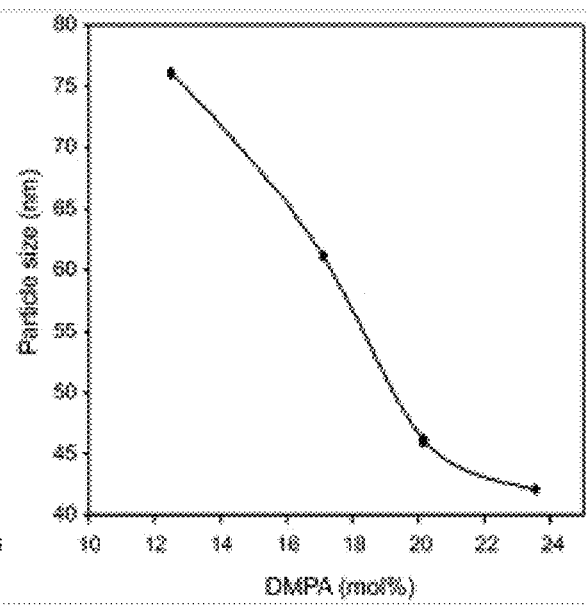
FIG. 5b shows Particle size of WBPU/clay nanocomposite dispersions with various DMPA content and 1 wt. % clay content.

In nanocomposite dispersions, PSD were significantly affected by carboxyl acid salt content, clay surface structure, and sonication. Initially, the mean particle size increased with increasing clay content in each series (see Tables 1, 2, 3, and FIG. 5 a). This indicates that clay particles were attached to polyurethane particles [Rahman et al. "Synthesis and Characterization of Waterborne Polyurethane/Clay Nanocomposite Effect on Adhesive Strength." *Macromol. Symp.* 249-250 251-258 (2006); Chinwanticharoen et al. "Preparation and Shelf-Life Stability of Aqueous Polyurethane Dispersions." *Macromol. Symp.* 216 229-239 (2004); and Bhanvase et al. "Synthesis of Exfoliated Poly(styrene-comethyl methacrylate)/Montmorillonite Nanocomposite Using Ultrasound Assisted In Situ Emulsion Copolymerization." *Chem. Eng. J.* 181-182 770-778 (2012)]. However, the increase in mean particle size is smaller at high DMPA content dispersions than at low DMPA content dispersions with fixed clay content (see FIG. 5 b). Similarly, the increase in mean particle size is smaller with Cloisite 30B® than with Cloisite 15A® with fixed clay and DMPA content (see WBPU20-15A and WBPU20-30B in Table 1). Moreover, the increase in mean particle size is smaller in method B (here WBPU20-30B4-M) than in method A (here WBPU20-30B4).

In all cases, the mean particle size was larger with clay because the silicate layers of the clay have larger steric hindrance, which may hinder molecular chain rotation. The steric hindrance of chain rotation leads to a reduction in the flexibility of chains, which expands the length of the polymer chain ends and the volume of the polymer chains. Ultimately, the dispersion effect is weak, leading to larger particle sizes. In contrast, Cloisite 30B® acted as a soft segment modification agent that shrinks the overall mean particle size. The sonication may have contributed to making smaller particles of clay leading to homogeneous distribution and thereby avoiding agglomeration. This results in a smaller particle size. Taken together, these factors produced the smallest particle size in the WBPU23-30B5-M dispersion.

Figure 6A:
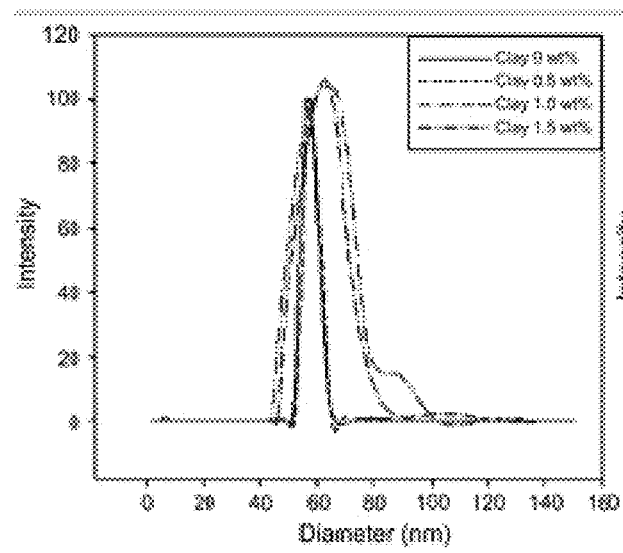
FIG. 6a shows PSD of WBPU/clay nanocomposite dispersions with various clay content and 17.13 mol % DMPA.
Figure 6B:
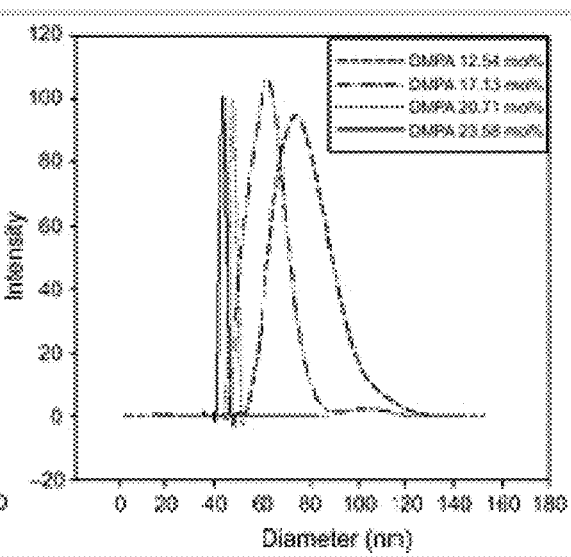
FIG. 6b shows PSD of WBPU/clay nanocomposites dispersions with various DMPA content and 1.00 wt. % clay contents.

When the PSD shapes are compared in each series (FIG. 6), the WBPU/clay nanocomposite dispersion has a different shape than that of the pristine WBPU dispersion. With low clay content or a high DMPA content, the nanocomposite dispersion displays a broader unimodal shape PSD. In contrast, high clay content or low DMPA content dispersions have a bimodal PSD shape. A typical WBPU17 series PSD is summarized in FIG. 6a. Here, the WBPU17-0 without clay and WBPU17-15A1 containing clay 0.5 wt. % samples were unimodal, whereas the WBPU17-15A2 containing clay 1.0 wt. % sample is bimodal PSD. WBPU17-15A3 displays a broad bimodal shaped PSD with one shoulder. FIG. 6 b summarizes the PSD shapes at different DMPA contents at a fixed clay content of 1.0 wt. %. WBPU12-15A2 containing DMPA 12.54 mol % shows a bimodal shape, whereas WBPU17-15A2 containing DMPA 17.13 mol % shows a broader monomodal shape. Both WBPU20-15A2 containing DMPA 20.71 mol % and WBPU23-15A2 containing DMPA 23.58 mol % show a sharp monomodal shape. A higher DMPA content generates smaller particle sizes, which may decrease the hydrodynamic volume leading to eventually a monomodal PSD. At higher clay content, this works in the reverse direction and makes either a broader monomodal shape or a bimodal shape. Note to Inventor: Please clarify this statement; what is the word "this" referring to? The different PSD shapes (unimodal/bimodal) in WBPU/clay nanocomposite dispersions are also reported elsewhere [Deng et al. "Preparation, Structure and Properties of Comb-Branched Waterborne Polyurethane/OMMT Nanocomposites." *Prog. Organ. Coat.* 60 11-16 (2007)]. At fixed DMPA and clay content, the PSD shape was broader with WBPU20-15A4 than with WBPU20-30B4 (data not shown). The presence of OH groups in Cloisite 30B® leads to smaller particle sizes, and contributes to the narrower PSD. Moreover, method B produces nanocomposites with narrower PSD than method A at the same composition. The additional sonication forces produce more homogeneous distribution, which narrows the PSD. The most interesting PSD is observed for two sonicated (method B) samples (WBPU20-30B4-M and WBPU23-30B5-M, which were made by using Cloisite 30B® and higher DMPA content. The PSD was monomodal and almost the same shape as that for pristine WBPU. The encapsulated and exfoliated clay in the parent polymer creates this type of PSD, which is free from clay effects.

Figure 7A:
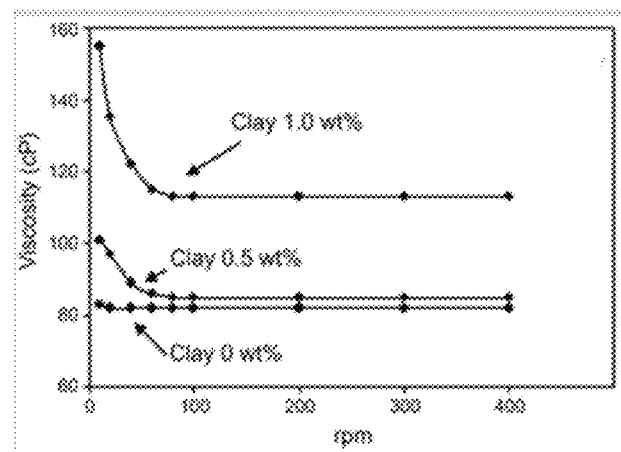
FIG. 7a shows Viscosity of WBPU/clay nanocomposite dispersion with various rpm with various clay contents and 12.54 mol % DMPA content.
Figure 7B:
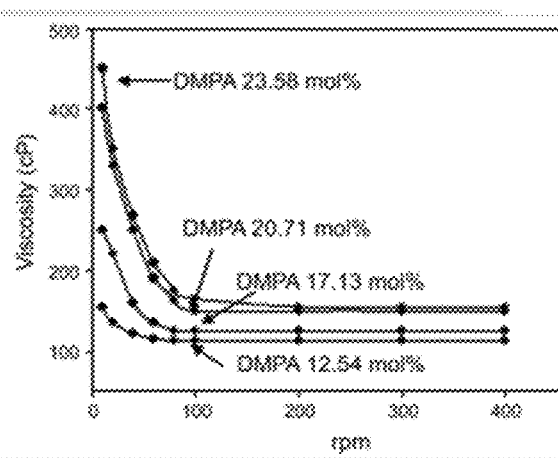
FIG. 7b shows Viscosity of WBPU/clay nanocomposite dispersion with various rpm with various DMPA content and 1.00 wt. % clay contents.

Viscosity Analysis:

The viscosities of all dispersions were investigated. FIGS. 7a and 7b show the variation in viscosity as a function of clay content and carboxyl acid salt content (DMPA), respectively, in the WBPU/clay nanocomposite dispersions. The addition of clay results in an increase in the viscosity of WBPU/clay nanocomposite dispersions compared to pristine WBPU dispersions. The viscosity continued to increase with increasing clay content. One possible explanation for this is that the interaction between clay particles and the carboxylate groups of polyurethane particles formed an internal network structure, which increased with increasing clay content. Consequently, the viscosity increases with increasing clay content. Also, the viscosity is dependent on the shear rate, i.e., various rpm levels. In FIG. 7a, the viscosity is shown at various rpm levels. The viscosity decreased with increasing rpm and at certain rpm, it becomes constant. This indicates that the WBPU/clay nanocomposite dispersions are pseudoplastic. Pseudoplastic behavior corresponded to a decrease in viscosity, caused by increasing rpm (shear rate). The variation in viscosity vs rpm is reversible. This is attributed to a disruption of the internal structure of the nanocomposite by shearing. The internal structure of the nanocomposite dispersion probably arises from the creation of a network between clay platelets and polyurethane, which gradually breaks down with increasing rpm, yielding a decrease in viscosity. The higher clay content in WBPU/clay nanocomposite dispersions creates higher viscosity, which is an indication of a higher net degree of interaction between the clay and polyurethane. Furthermore, the viscosity decline is proportional to clay content at lower rpm, whereas the viscosity of WBPU/clay nanocomposite dispersions, also dependent on clay content, remains constant after a certain rpm. This constant viscosity is achieved at lower RPM at lower clay content compared to that at higher clay content. The internal network structure formed by clay and polymer is produced by weak bonding interactions such as H-bonding, columbic forces, and van der Waals forces. At higher clay and DMPA content, the internal network structure is stronger and requires a higher rpm to break it up. FIG. 7b shows plots of viscosity vs RPM at various DMPA content. The viscosity increased with increasing DMPA content. Hydrogen bonds and coulombic forces increase with increasing DMPA content, which leads to increase in viscosity of WBPU/clay nanocomposite dispersions [Chattopadhyay et al. "Structural Engineering of Polyurethane Coatings for High Performance Applications." *Prog. Polym. Sci.* 32 352-418 (2007)]. With increasing rpm, the viscosity decreases and displays pseudoplastic behavior due to hydrogen bonds breaking up leading to decrease in viscosity. The effect of the clay surface structure (15A/30B) on viscosity was also measured (data not shown). At the same content of clay and DMPA, the viscosities of 30B nanocomposites are higher than those of 15A. This observation could be due to crosslinking of the clay hydroxyl groups with diisocyanate and hydrogen bonds of free hydroxyl groups. See Huh et al. "Properties of Waterborne Polyurethane/Clay Nanocomposite Adhesive." *J. Adhes. Sci. Technol.* 23, 739-751 (2009). The viscosity at various rpm levels shows a similar trend for nanocomposite dispersions using Cloisite 15A and 30B, i.e., the viscosity decreased with increasing rpm (data not shown). Also, a constant viscosity arises at lower RPM with Cloisite 15A than with Cloisite 30B dispersions. In addition, the viscosities of dispersions prepared by the two methods of the disclosure are compared. The viscosities of the dispersions prepared by method B are higher than those prepared by method A (Table 3). The tiny clay particles interact strongly with polyurethane leading to increase viscosity for dispersion prepared by method B. The WBPU20-30B4-M and WBPU23-30B5-M dispersions showed comparatively higher viscosity at various rpm (data is not shown) compared to all other dispersions. It followed trends similar to the other dispersions due to a combination of higher DMPA content, the presence of OH groups on the clay surface structure, and the presence of tiny clay particles.

The stability WBPU/clay nanocomposite dispersion is dependent of the carboxylic acid salt content, clay surface structure, and the amount of the clay as well as the mechanical force use to mix the components. Using higher carboxylic acid salt content (20.71 or mol %) and Cloisite 30B and applying sonication as an additional mechanical force produced highly stable with long storage time of 12 months WBPU/clay nanocomposite dispersions WBPU20-30B4-M and WBPU23-30B5-M.

The invention claimed is:

1. A method for preparing a waterborne nanocomposite dispersion, comprising:
   mixing a diisocyanate and an organoclay to form a first mixture;
   mixing a polyol, a carboxylic acid having hydroxyl functionality and a solvent to form a second mixture;
   mixing the first mixture with the second mixture and heating at a temperature in a range of 40-90° C. for 2-6 hours to form a prepolymer with a carboxylic acid group;
   mixing a base with the prepolymer with a carboxylic acid group to form a prepolymer with a carboxylic acid salt;
   mixing water with the prepolymer with a carboxylic acid salt to form a dispersion; and
   reacting the dispersion with a diamine as a chain extender to form the waterborne nanocomposite dispersion.

2. The method of claim 1, further comprising sonicating the first mixture for 10-30 minutes prior to the reacting.

3. The method of claim 1, wherein the organoclay is modified with N,N-bis(2-hydroxyethyl)-N-methyl-N-tallow ammonium chloride.

4. The method of claim 3, wherein the tallow is reduced or unreduced.

5. The method of claim 1, wherein the diisocyanate is selected from the group consisting of isophorone diisocyanate, methylene bis-phenyl isocyanate, hexamethylene diisocyanate, and 4,4'-dicyclohexylmethane diisocyanate.

6. The method of claim 1, wherein the polyol is selected from the group consisting of poly(tetramehyleneoxide) glycol, polyethylene glycol, polybutylene glycol, and polypropylene glycol.

7. The method of claim 1, wherein the carboxylic acid contains at least two hydroxyl groups and is selected from the group consisting of dimethylol propionic acid, 2,2-bis(hydroxymethyl)butyric acid, and 3-hydroxy-2,2-bis(hydroxymethyl)-propionic acid.

8. The method of claim 1, wherein the solvent is 1-methyl-2-pyrrolidone or dimethylformamide.

* * * * *